United States Patent [19]

Chen

[11] Patent Number: 5,370,351
[45] Date of Patent: Dec. 6, 1994

[54] SHOCK ABSORBING ASSEMBLY FOR A BICYCLE SEAT

[75] Inventor: Chin-Pei Chen, Taichung Hsien, Taiwan, Prov. of China

[73] Assignee: Kalloy Industrial Company, Ltd., Taichung Hsien, Taiwan, Prov. of China

[21] Appl. No.: 73,332

[22] Filed: Jun. 7, 1993

[51] Int. Cl.$^5$ ............................................. B62J 1/02
[52] U.S. Cl. ................... 248/600; 297/209; 267/177; 280/283
[58] Field of Search ............... 297/209, 208; 248/622, 248/600, 602, 599; 280/220, 283, 287; 267/177, 178, 226

[56] References Cited

U.S. PATENT DOCUMENTS

| 559,841 | 5/1896 | Brooks | 280/283 |
| 2,623,573 | 12/1952 | Di Gaetano | 280/283 |
| 2,664,941 | 1/1954 | Gillespie | 248/602 X |

FOREIGN PATENT DOCUMENTS

| 839162 | 4/1952 | Germany | 280/283 |
| 18707 | of 1899 | United Kingdom | 280/283 |
| 690987 | 5/1953 | United Kingdom | 280/283 |

*Primary Examiner*—Laurie K. Cranmer
*Attorney, Agent, or Firm*—Flehr, Hohbach, Test, Albritton & Herbert

[57] ABSTRACT

A shock absorbing assembly includes a block securely mounted in a bicycle seat tube and having a vertical threaded bore through which an adjusting bolt passes. A fixed block is mounted in the seat tube above the block, having an upper side and a lower side to which a distal end of the adjusting bolt is securely attached. An upper block is slidably mounted in the seat tube above the fixed block. A spring is mounted between the fixed block and the upper block. A seat post is received in the seat tube with a bottom end thereof resting on the upper side of the movable upper block. A transverse bore is formed in the seat post at a section above the seat tube. A seat mechanism includes an upper ring element, a lower ring element, and a pair of guiding rods extending therebetween. A balance rod passes through the transverse bore in the seat post and has two vertical holes through which the guiding rods pass. The lower ring element has inner threadings to engage with threadings formed on an outer periphery of the upper end of the seat tube.

5 Claims, 3 Drawing Sheets

SHOCK ABSORBING ASSEMBLY FOR A BICYCLE SEAT

BACKGROUND OF THE INVENTION

1. Field of the Invention

The present invention relates to a shock absorbing assembly for a bicycle seat.

2. Description of related art

A kind of shock absorbing assembly has been proposed to absorb shocks so as to comfort the cyclist during cycling. However, in such an assembly, when the cyclist sits on the seat, the shock absorbing spring is immediately compressed, even though no shock is encountered. Thus, the spring is often in a compressed status which shortens the life thereof. Furthermore, the seat post tends to be lowered and impacts and thus might damage the guiding pins when subjected to a shock. Moreover, the inner peripheral surface of the seat tube and the outer periphery surface of the seat post are easily worn due to frequent frictional motion therebetween.

Therefore, there has been a long and unfulfilled need for an improved shock absorbing assembly to mitigate and/or obviate the above-mentioned drawbacks.

SUMMARY OF THE INVENTION

The present invention provides a shock absorbing assembly which includes a block securely mounted in a bicycle seat tube and having a vertical threaded bore through which an adjusting bolt passes. A fixed block in the seat tube above the block, having an upper side and a lower side to which a distal end of the adjusting bolt is securely attached. An upper block is slidably mounted in the seat tube above the fixed block. A spring is mounted between the fixed block and the upper block. A seat post is received in the seat tube with a bottom end thereof resting on the upper side of the slidable upper block. A transverse bore is formed in the seat post at a section above the seat tube.

The shock absorbing assembly further includes a seat mechanism that includes an upper ring element, a lower ring element, and a pair of guiding rods extending therebetween. A balance rod passes through the transverse bore in the seat post and has two vertical holes through which the guiding rods pass. The lower element has inner threadings to engage with threadings formed on an outer periphery of the upper end of the seat tube.

Preferably, a tubular plug is inserted between the seat post and the upper element, such that the seat post does not immediately move downward when the cyclist sits on the bicycle seat. A tubular gasket member is provided between the seat tube and the seat post to avoid excess wear during the up and down movement of the seat post in the seat tube.

Other objects, advantages, and novel features of the invention will become more apparent from the following detailed description when taken in conjunction with the accompanying drawings.

DESCRIPTION OF THE PREFERRED EMBODIMENT

Figure 5:
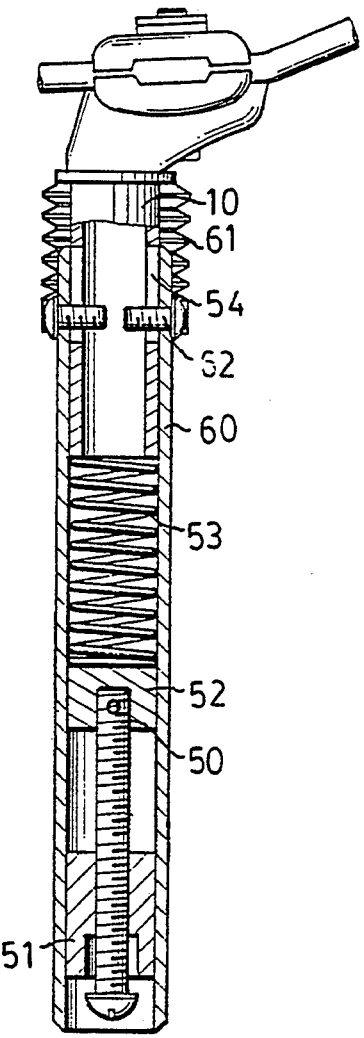
FIG. 5 is a shock absorbing assembly according to prior art.

For a better understanding of the present invention, reference is made to FIG. 5 in which a conventional shock absorbing assembly for a bicycle seat is shown. The shock absorbing assembly generally includes a block 51 securely mounted in the seat tube 60 and having a bore through which an adjusting bolt 50 passes. The distal end of the adjusting bolt 50 securely engages with a lower end of a fixed block 52 whose upper end to which a lower end of the shock absorbing spring 53 is attached. The seat post 10 is received in the seat tube 60 with a lower end thereof resting on the upper end of the spring 53. A pair of vertical elongate passage holes 54 are formed in the seat post 10. A pair of horizontal guiding pins 62 project into the seat tube 60 as well as the elongate passage holes 54, such that the seat post 10 may move up and down in the seat tube 60. A bellows member 61 is provided around the upper section of the seat tube 60 and the seat post 10.

By such an arrangement, when the bicycle is subjected to a shock, the seat post 10 moves up and down in the seat tube 60 so that the spring 53 may receive the shock energy. The stroke of the seat post 10 is defined by the elongate passage holes 54. Such a structure still has several disadvantages. Firstly, the elongate passage holes 54 and the guiding pins 62 are in loose engagement, i.e., the supporting effect for the seat post 10 is poor. This means when the cyclist sits on the seat, the spring 53 is immediately compressed, even before a shock is encountered. Thus, the spring 53 is often in a compressed status which shortens the life thereof. Furthermore, the seat post 10 tends to be lowered and thus impacts the adjusting bolts 62 when subjected to a shock, which might damage the guiding pins 62 and result in accidents. Moreover, the inner peripheral surface of the seat tube 60 and the outer periphery surface of the seat post 10 are easily worn due to frequent relative frictional motions therebetween.

The present invention intends to provide an improved shock absorbing assembly to mitigate and/or obviate the above-mentioned drawbacks.

Figure 1:
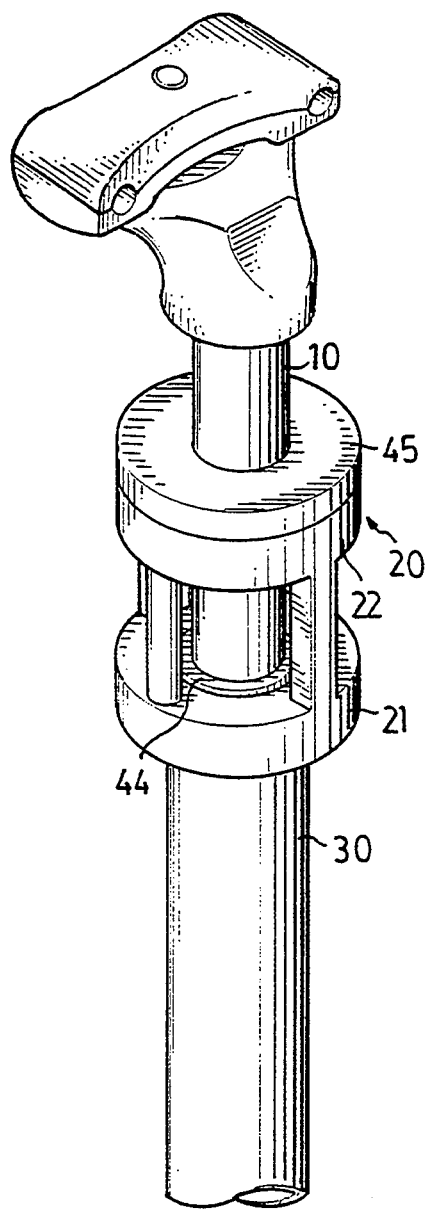
FIG. 1 is a perspective view of a shock absorbing assembly for a bicycle seat in accordance with the present invention.
Figure 2:
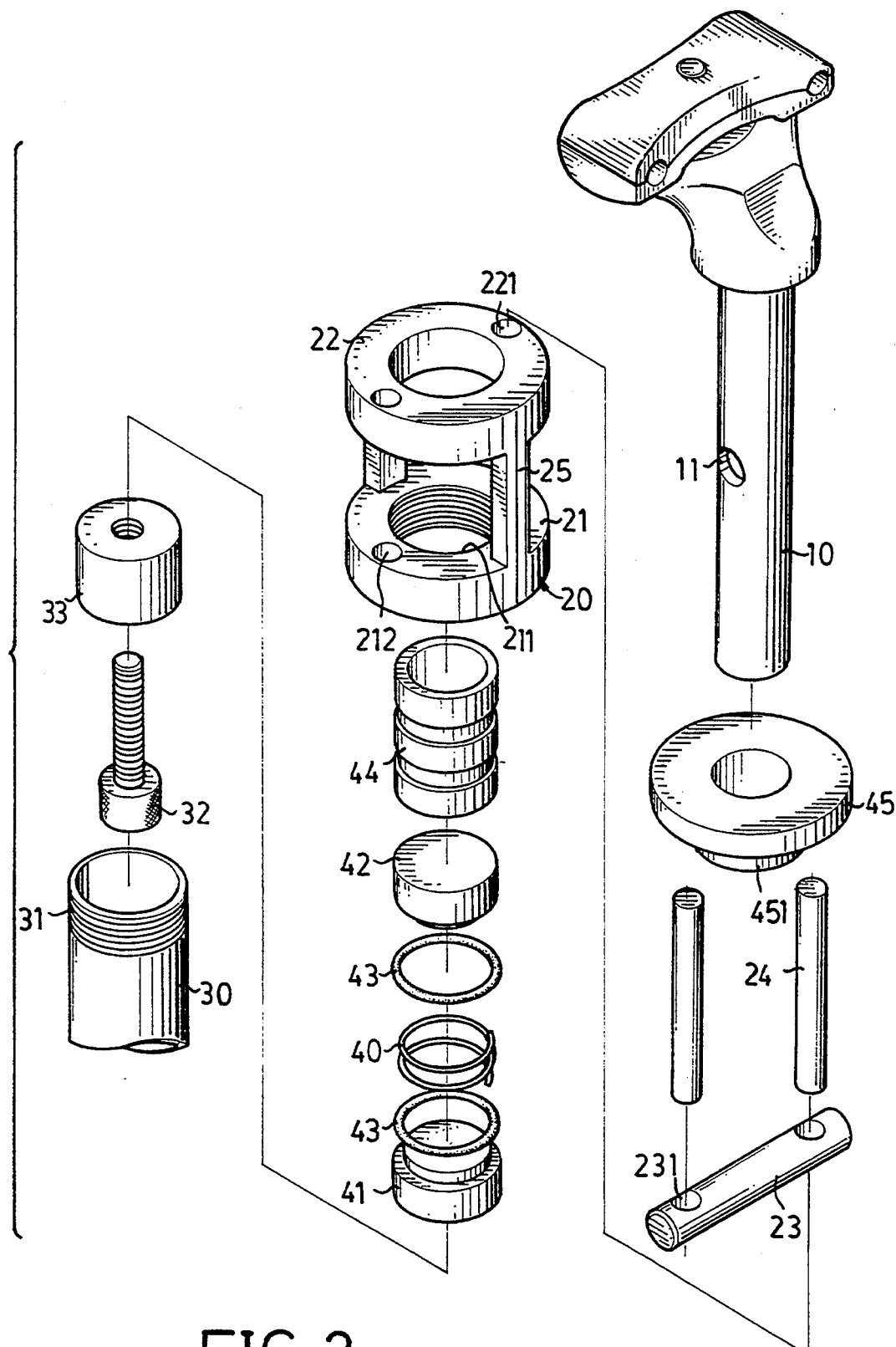
FIG. 2 is an exploded view of the shock absorbing assembly.
Figure 3:
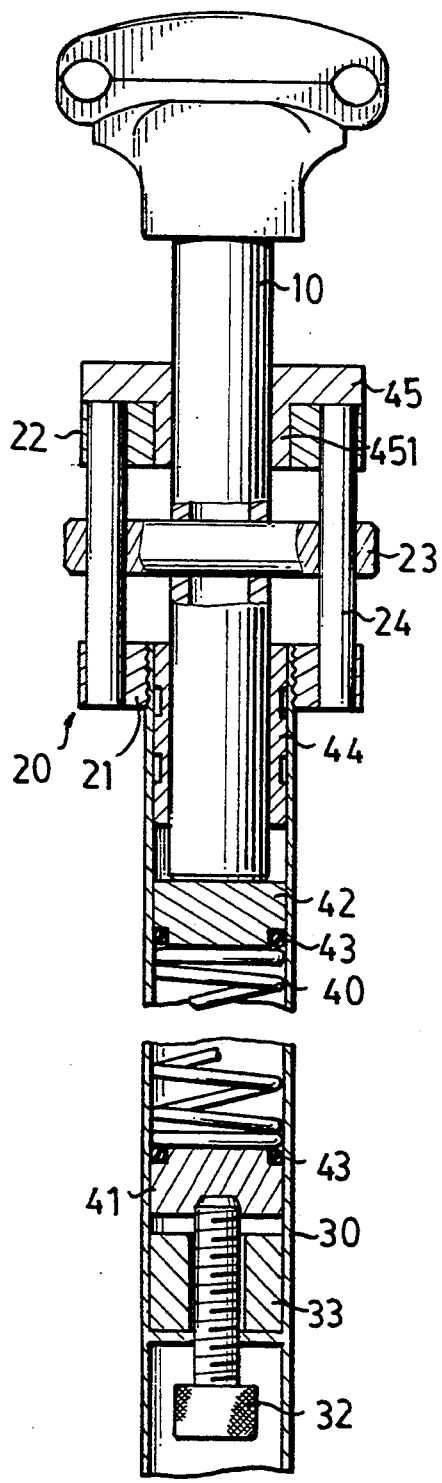
FIG. 3 is a side view, partly sectioned, of the shock absorbing assembly.

Now referring to FIGS. 1 through 3, a shock absorbing assembly in accordance with the present invention generally includes a block 33 securely mounted in the seat tube 30 and having a vertical threaded bore (not labeled) through which an adjusting bolt 32 passes. The distal end of the adjusting bolt 32 securely engages with a lower side of a fixed block 41 whose upper end to which a lower end of the shock absorbing spring 40 is attached.

An upper block 42 is mounted in the seat tube 30 with a lower side thereof which rests on the upper end of the spring 40. The upper side of the upper block 42 contacts with the bottom end of the seat post 10 which has a transverse bore 11.

The shock absorbing assembly further includes a seat mechanism 20 and a balance rod 23. As shown in the figures, the seat mechanism 20 includes an upper ring element 22, a lower ring element 21, and a pair of connecting members 25 extending therebetween. Preferably, the upper ring element 22, the lower ring element 21, and the connecting members 25 are integrally formed. Two holes 221, preferably diametrically opposite, are provided in the upper ring element 22. The lower ring element 21 has two holes 212 in alignment with associated holes 221. A pair of guiding rods 24 extend in the aligned holes 212 and 221. A balance rod 23, which passes through the transverse bore 11 in the seat post 10, has two exposed vertical holes 231 through which the guiding rods 24 pass. The lower ring element 21 has inner threadings 211 so as to engage with threadings 31 formed on an outer periphery of the upper end of the seat tube 30 (see FIG. 2).

Preferably, a tubular plug 45, which is T-shaped in section, is inserted between the middle section of the outer periphery of the seat post 10 and the upper ring element 22, such that the seat post 10 does not immediately move downward when the cyclist sits on the bicycle seat. Preferably, a tubular gasket member 44 is provided between the inner periphery of the upper end of the seat tube 30 and the outer periphery of the lower section of the seat post 10. Preferably, rubber rings 43 are provided to an upper side of the lower fixed block 41 and the lower side of the upper movable block 42.

Figure 4:
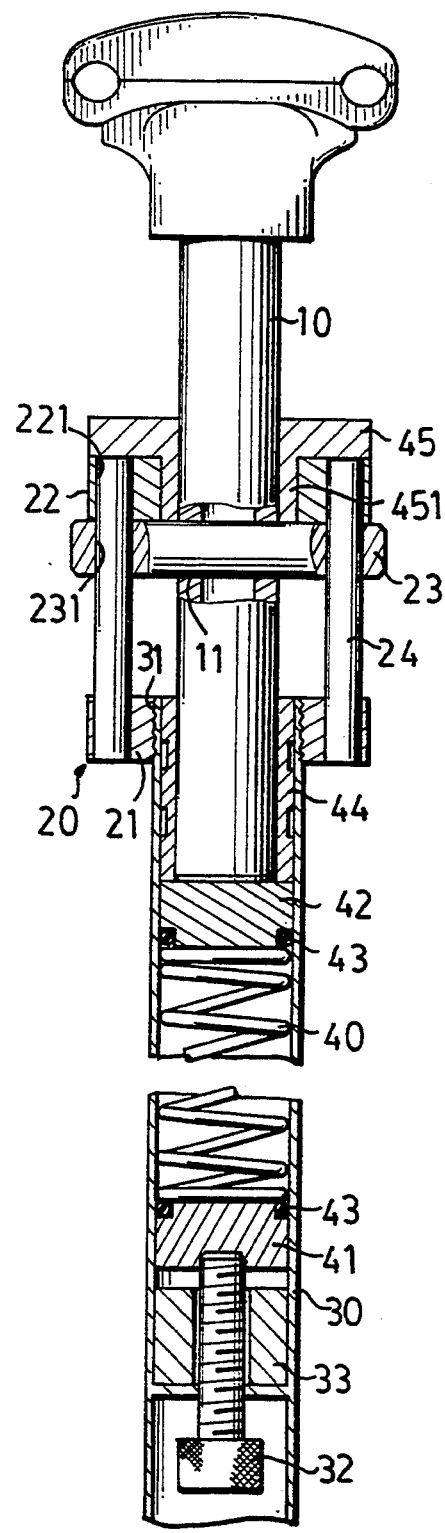
FIG. 4 is a view similar to FIG. 3, illustrating the motion of the seat post during shock.

By such an arrangement, when the bicycle is subjected to a shock, such as on a rugged road, the seat post 10 together with the balance rod 23 move downward, as shown in FIG. 4. Under the provision of the balance means, the seat post 10 does not wobble during its downward movement. Furthermore, the provision of the gasket avoids excess wear during the up and down movement of the seat post 10 in the seat tube 30. When elastic fatigue occurs in the spring, the user may adjust the adjusting bolt to adjust the tightness thereof.

Although the invention has been explained in relation to its preferred embodiment, it is to be understood that many other possible modifications and variations can be made without departing from the spirit and scope of the invention as hereinafter claimed.

I claim:

1. A shock absorbing assembly comprising:

a block (33) securely mounted in a bicycle seat tube (30) and having a vertical threaded bore extending along a longitudinal axis of said seat tube (30), said seat tube (30) having threadings formed on an outer periphery of an upper end thereof;

an adjusting bolt (32) passing through said vertical threaded bore in the block (33);

a fixed block (41) in the seat tube (30) above the block (33), having an upper side and a lower side to which a distal end of the adjusting bolt (32) is securely attached;

an upper block (42) slidably mounted in the seat tube (30) above the fixed block (41);

an elastic means (40) mounted between the fixed block (41) and the upper block (42);

a seat post (10) received in the seat tube (30) with a bottom end thereof resting on the upper side of the slidable upper block (42), a transverse bore (11) being formed in the seat post (10) at a section above the seat tube (30); and a seat mechanism (20) including an upper ring element (22), a lower ring element (20), a pair of guiding rods (24) extending between said upper and lower ring elements (22 and 21), and a balance rod (23) passing through the transverse bore (11) in the seat post (10) and having two vertical holes (231) through which said guiding rods (24) pass, the lower element (21) having inner threadings to engage with the threadings formed on the upper end of the seat tube (30).

2. The shock absorbing assembling as claimed in claim 1 wherein a tubular plug (45) is inserted between the seat post (10) and the upper element (22).

3. The shock absorbing assembly as claimed in claim 1 wherein a tubular gasket member (44) is provided between the seat tube (30) and the seat post (10).

4. The shock absorbing assembly as claimed in claim 1 wherein a rubber ring (43) is provided to an upper side of the lower fixed block (41).

5. The shock absorbing assembly as claimed in claim 1 wherein a rubber ring (43) is provided to the lower side of the upper movable block (42).

* * * * *